United States Patent [19]

Wölki

[11] Patent Number: 4,632,947

[45] Date of Patent: Dec. 30, 1986

[54] METHOD OF PRODUCING A POLYTETRAFLUORETHYLENE MATERIAL

[75] Inventor: Peter Wölki, Monchen-Gladbach, Fed. Rep. of Germany

[73] Assignee: Norton Pampus GmbH, Willich, Fed. Rep. of Germany

[21] Appl. No.: 807,094

[22] Filed: Dec. 10, 1985

[30] Foreign Application Priority Data

Jan. 3, 1985 [DE] Fed. Rep. of Germany ....... 3500061

[51] Int. Cl.$^4$ .......................... C08K 9/04; C08L 27/12
[52] U.S. Cl. .................................... 523/206; 523/205; 523/209; 523/307
[58] Field of Search ........................ 523/205, 209, 206

[56] References Cited

U.S. PATENT DOCUMENTS

| 4,026,863 | 5/1977 | Iseki et al. | 523/205 |
| 4,128,693 | 12/1978 | Dhami et al. | 428/375 |

FOREIGN PATENT DOCUMENTS

| 0144157 | 6/1985 | European Pat. Off. | 523/205 |

*Primary Examiner*—Herbert J. Lilling
*Attorney, Agent, or Firm*—Sprung Horn Kramer & Woods

[57] ABSTRACT

The present invention relates to a method of producing a polytetrafluorethylene material comprising filler particles embedded therein. In fact, the mechanical characteristics of most synthetic materials can be improved by the inclusion of filler particles. Nevertheless, tests performed to embed filler particles in PTFE have unexpectedly resulted in the reduction of essential mechanical characteristics (tensile strength, rupture elongation) due to this inclusion. According to the invention, this disadvantage is prevented by a method according to which the filler particles are coated with an in melted condition relatively low viscous and/or polar perfluoralkoxy copolymer (PFA), tetrafluoroethylene-perfluorpropylene copolymer (FEP) or mixtures thereof serving as adhesive agent before mixing them with polytetrafluorethylene. This permits to obtain substantial improvement of the mechanical properties.

11 Claims, No Drawings

METHOD OF PRODUCING A POLYTETRAFLUORETHYLENE MATERIAL

BACKGROUND OF THE INVENTION

It is known that the mechanical characteristics of most synthetic materials can be improved by the inclusion of appropriate filler particles.

Trials of embedded filler particles into non-meltable polytetrafluorethylene have been made. Unexpectedly, this has resulted, due to the inclusion of the filler particles, in a reduction of essential mechanical characteristics, such as for instance tensile strength and rupture elongation. The tendency according to which the characteristics of PTFE change due to the admixture of filler substances is shown in the table hereafter:

| Characteristics | PTFE + glass | PTFE + carbon | PTFE + graphite | PTFE + bronze |
|---|---|---|---|---|
| density | x | — | — | x |
| compression strength | x | x | x | x |
| pressure module E | x | x | x | x |
| abrasive resistance | x | x | x | x |
| friction coefficient | x | x | x | x |
| temperature range | O | O | O | O |
| dielectric strength | — | — | — | — |
| porosity | x | x | x | x |
| rupture strength | — | — | — | — |
| rupture elongation | — | — | — | — |
| yield stress | — | — | — | — |
| elongation to yield strength | — | — | — | — |
| tension module E | — | — | — | — |
| fatigue strength | — | — | — | — |
| fatigue module E | — | — | — | — |

(Explanation of signs:
x = increased;
— = reduced;
O = unchanged

The known low level of the mechanical strength characteristics of PTFE limits the application possibilities of this material, which in view of its chemical resistance, its excellent electric and dielectric characteristics, its antiadhesivity, its temperature resistance and its unusual antifriction properties is technically particularly interesting synthetic material when PTFE can be used at all in demanding mechanical applications, it requires in specific cases complex structural compensation for its mechanical weaknesses.

Consequently, it is an object of the present invention to allow the production of a material comprising PTFE and filler particles in such a way that the admixture of said filler particles does not cause any substantial deterioration of part of the mechanical characteristics and that the chemical, electric, antiadhesive, thermal and antifriction properties of PTFE are substantially maintained.

SUMMARY OF THE INVENTION

For achieving said object there is suggested according to the invention a method appropriate for the production of such a material according to which is used as adhesive increasing agent perfluoralkoxy copolymer (PFA), tetrafluorethylene-perfluorpropylene copolymer (FEP) or a mixture of these substances. Before mixing with the PTFE the filler particles are coated with the PFA and/or FEP.

One of the characteristics of PTFE, which when melted has a relatively low viscosity, consists in the fact that due to its molecular structure (branched chains, included foreign atoms) it presents a certain polarity favouring moistening properties and adhesive strength.

Polytetrafluorethylene (with a melting viscosity of approximately $10^{10}$ pascal seconds, abbreviated hereinafter as Pa.s) still remains gelatinous when it is exposed to softening temperature or when the latter is exceeded. The moistening ability of such a synthetic material is relatively low. The invention is based on the discovery that the deterioration of some mechanical characteristics following the admixture of filler particles could be due to the low moistening capability of PTFE. This has been confirmed because due to the application of the method according to the invention in no case does a deterioration of mechanical characteristics occurs when filler particles are admixed in order to increase pressure resistance.

The adhesion favouring agent is a meltable synthetic material which has at least in melted condition a relatively low viscosity ranging for instance from $1.5 \times 10^2$ to $5 \times 10^4$ Pa.s or at the utmost about $5 \times 10^9$ Pa.s. Appropriate adhesion favouring agents are the following: perfluoralkoxy copolymer (PFA) tetrafluorethylene-perfluorpropylene copolymer (FEP) or mixtures thereof.

According to the invention it is also advantageous if the adhesion favouring agent is present in the form of a dispersion or a varnish in which the filler particles are soaked.

Subsequently, the soaked filler particles can be dried and added in powdered form to the PTFE which is also present as powder. During later processing of this mixture under the influence of an appropriate high temperature which should reach or exceed the softening temperature of the PTFE, the solid inclusion into the PTFE of the filler particles provided with the adhesion favouring agent occurs.

For improving adhesion, there is further suggested according to the invention to submit the filler particles before the coating operation to a thermal pretreatment. If glass fibers are used as filler particles it is recommended to first desize the latter, i.e. to remove the sizing agent still adhering to the fibers. Such sizing agents are found in many cases on the fibers in order to improve their further processability.

In case that hygroscopic filler particles are used it is recommended to carry out a thermal pretreatment for the purpose of drying. This permits to obtain degassing of separation products. A thermal pretreatment further permits to increase the surface of the filler particles. If for instance mica is used the latter will split under the influence of heat thus increasing the surface.

If filler particles made of metal, glass or ceramic material are used it may be advantageous according to the invention to roughen the filler particles before coating by etching for instance with hydrofluoric acid. This permits to activate and enlarge the surface of the filler particles.

Furthermore, it may be advantageous if filler particles presenting bad adhesion characteristics are provided with a primer before coating the adhesion favouring agent, for instance on the basis of organic metal compounds. Advantageous would also be the use of commercial fluor synthetic varnishes or dispersions which comprise already appropriate primers.

EXAMPLE 1

(a) Short glass fibers made of E-glass having a fiber diameter of about 15 μm and a ratio of length to diameter of about 100:1 are thermally desized for about 12 hours at a temperature of 450° C.

(b) Etching the glass fibers in a 40% hydrofluoric acid at 40° C. for about 18 minutes.

(c) Rinsing the glass fibers under running water.

(d) Second rinsing operation with deionized water.

(e) Diluting commercial FEP-dispersions to a solid particle content of 10% by means of water.

(f) Integrating the diluted FEP-dispersion and the etched and rinsed glass fibers into a tumbler. Mixing time about 12 minutes.

(g) Filtering-off the water.

(h) Drying the mixture in a warming oven at 120° C. for 6 hours. Cooling in a desiccator.

(i) Rotating the FEP-soaked glass fibers in a tumbler for 1 minutes at 1400 $min^{-1}$.

(j) Integrating the soaked and dried glass fibers into the PTFE-powder in a tumbler. The glass fiber portion in the total mixture amounts to 15%.

(k) Preparation of a sample by pressing and sintering.

(l) Determination of the physical characteristics of the sample compared to a parallely fabricated sample bar made of a commercial PTFE-compound comprising 15% of glass fibers.

It appears that the values of the following characteristics
rupture strength
rupture elongation
yield strength
elongation to yield strength
fatigue module E
tension module E
deformation under load
ball-pressure hardness
are better by about 60 to 180% for the semi-finished products produced according to the invention than for semiproducts fabricated from commercial PTFE-compound.

EXAMPLE 2

Glass balls having an average diameter of about 40 μm are treated as defined in example 1, nevertheless with the difference that after the second rinsing operation (par. 2) the glass balls are treated with a primer on the basis of an organic metal compound (in an immersion process) and that instead of the FEP-dispersion (par. e) is used a PFA-dispersion having a solid particle content of 20%.

In this case the mechanical strength properties are better by 120–250% than with commercial PTFE-compounds comprising 15% of glass balls.

I claim:

1. A process for producing a composite material of filler-reinforced polytetrafluoroethylene (PTFE) resin, said process comprising the steps of:
   (a) coating a plurality of filler particles with a coating material having a viscosity at the softening temperature of PTFE not greater than $5 \times 10^9$ pascal seconds, said coating material being selected from the group consisting of perfluoroalkoxy copolymer (PFA), tetrafluroethylene-perfluoropropylene copolymer (FEP), and mixtures of PFA and FEP;
   (b) mixing the coated filler particles from part (a) with PTFE;
   (c) shaping the mixture from part (b) into the desired shape of the final composite; and
   (d) heating the shaped mixture from part (c) to a temperature at least as high as the softening point of PTFE so as to form a coherent composite.

2. A process according to claim 1, wherein said plurality of filter particles comprises at least 15% by weight of the total composite material.

3. A process according to claim 2, wherein said coating step comprises the following sub-steps:
   (a) mixing said coating material into a dispersing liquid to form a dispersion;
   (b) soaking said filler particles in said dispersion;
   (c) separating said soaked filler particles from said dispersion; and
   (d) expelling said dispersing liquid from said soaked filler particles in such a manner as to produce solid discrete coated filler particles for mixing with PTFE.

4. A process according to claim 1, wherein said coating step comprises the following sub-steps:
   (a) mixing said coating material into a dispersing liquid to form a dispersion;
   (b) soaking said filler particles in said dispersion;
   (c) separating said soaked filler particles from said dispersion; and
   (d) expelling said dispersing liquid from said soaked filler particles in such a manner as to produce solid discrete coated filler particles for mixing with PTFE.

5. A process according to claim 4, wherein said PTFE is in powder form when first mixed with said coated filler particles.

6. A process according to claim 5, wherein said filler particles are fibers of Type E glass with a fiber diameter of about 15 microns and a ratio of length to diameter of about 100, said fibers are desized by exposure to a temperature of at least 450° C. for at least twelve hours and after desizing are etched with hydrofluoric acid and rinsed before being mixed with said material for coating, and said material for coating is FEP and is dispersed to a concentration of not more than 10 percent in water before being used to coat said desized and etched filler fibers.

7. A process according to claim 5, wherein said filler particles are glass balls with a diameter of about 40 microns; said balls are etched with hydrofluoric acid, rinsed, and primed with an organometallic primer before being mixed with said material for coating, and said material for coating is PFA and is dispersed to a concentration of not more than 20 percent in water before being used to coat said desized and etched filler balls.

8. A process according to claim 3, wherein said PTFE is in powder form when first mixed with said coated filler particles.

9. A process according to claim 1, wherein said filler particles are thermally pretreated before being coated according to step (a).

10. A process according to claim 1, wherein said filler particles are precoated with a primer to increase adhesion before being coated according to step (a).

11. A process according to claim 1, wherein said filler particles are metal, glass, or ceramic material and are roughened by etching before being coated according to step (a).

* * * * *